Sept. 20, 1955
F. WILLIS, JR
2,718,612
PHOTOTUBE CIRCUIT
Filed April 13, 1953
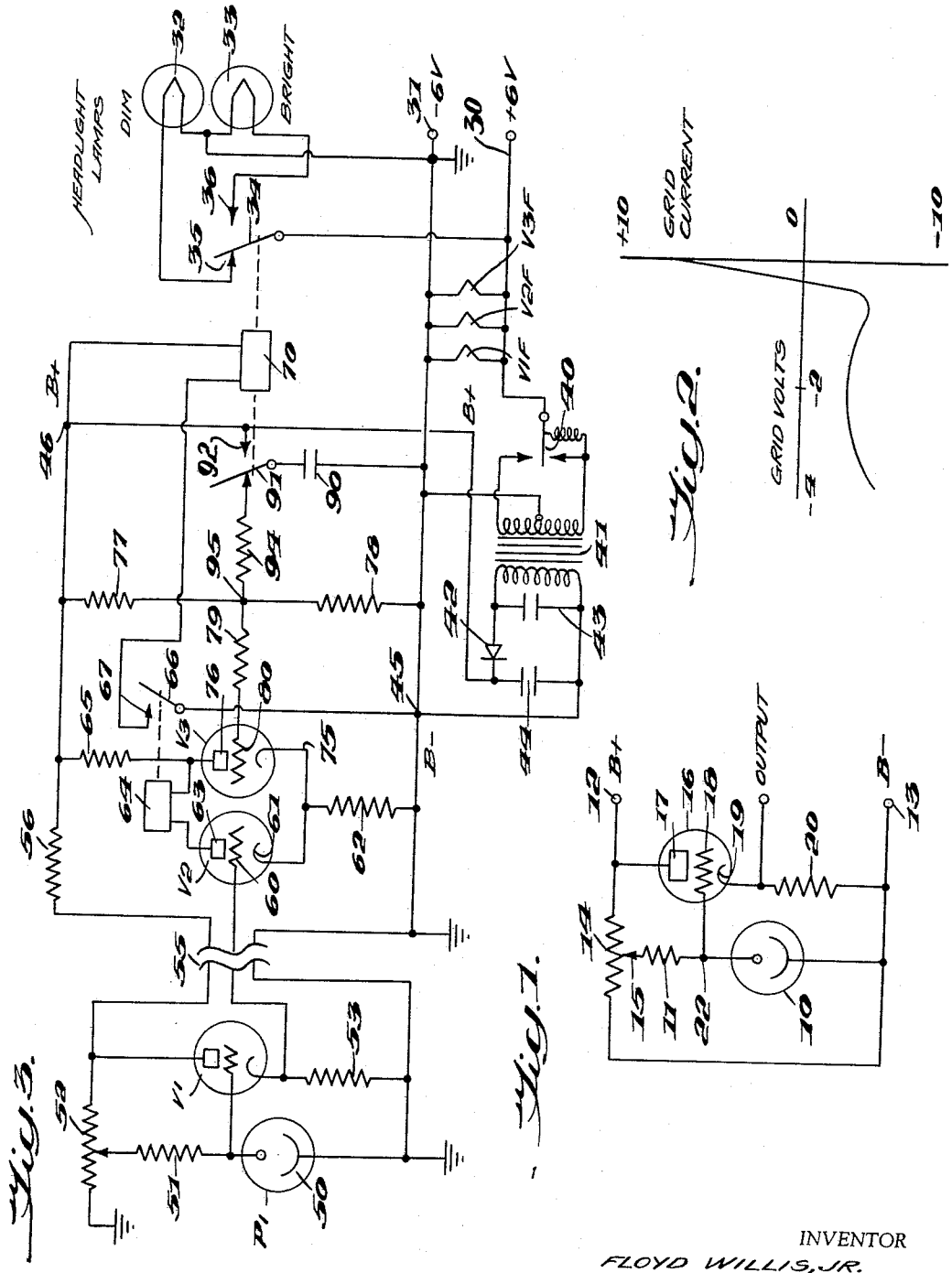
INVENTOR
FLOYD WILLIS, JR.
BY Dos. T. Hatfield
ATTORNEY

United States Patent Office 2,718,612
Patented Sept. 20, 1955

2,718,612

PHOTOTUBE CIRCUIT

Floyd Willis, Jr., Silver Spring, Md.

Application April 13, 1953, Serial No. 348,251

5 Claims. (Cl. 315—83)

The present invention relates to light sensitive circuits and more particularly to an improved light sensitive automatic vehicle headlight dimming system.

It has been recently proposed to provide arrangements for automatically dimming the headlights of a vehicle in response to the approach of another vehicle in the opposite direction. Such arrangements employ a light sensitive device to respond to the light from the oncoming vehicle's headlights to operate a relay and switch the equipped vehicle's headlights from bright to dim until after the oncoming vehicle has passed. The light sensitive device and circuit must necessarily be extremely sensitive since it should be operative in the dark of night practically as soon as an oncoming vehicle's headlights become visible. In addition to the requirement of high sensitivity, the light sensitive device and circuit must be stable in its operation over a varying range of operating voltage since the conventional vehicle battery potential may vary under different conditions of vehicle operation.

In order to satisfy both the requirement of high sensitivity and good stability, one previously-known arrangement requires the use of a photo-multiplier tube having at least nine stages of dynode amplification in a single evacuated tube envelope. Such form of photo-multiplier tube is quite expensive and requires very high operating potentials for reliable operation and, accordingly, is not entirely satisfactory.

A simple phototube, which is very much less expensive than a photo-multiplier tube, and which will operate from a comparatively low operating potential, and which further does not require any filament power since electrons are emitted directly in response to light energization, would seem to be much more preferable to the presently-used photo-multiplier tube. However, prior to the present invention, a simple phototube did not have the required sensitivity and, consequently, high gain direct current amplification was required. High gain direct current amplifiers are notoriously unstable, being particularly sensitive to drift, due to the changes in operating potential such as would be encountered in an automotive vehicle or the like. Therefore, to obtain the required sensitivity with a simple phototube, according to previously known techniques, the stability of the light sensitive circuit would be unsatisfactory, and therefore the use of simple phototubes was impracticable.

It is an object of the present invention to provide an improved light sensitive circuit arrangement using a simple phototube operating at a comparatively low direct current operating potential and having high sensitivity such that small changes in light intensity on the phototube produce comparatively large changes in signal voltage to be usable without appreciable voltage amplification and therefore not requiring high gain direct current amplifiers.

A feature of the invention is the use of a simple phototube connected in series with a very high phototube load resistance in the order of 10,000 megohms or more, connected to a source of direct current having a potential of about 100 volts. In order to apply the changes in potential appearing across such a very high load resistance due to small changes in light intensity on the phototube, a coupling device having a very high input resistance is required. I have found that a vacuum tube connected in a cathode follower circuit operating with circuit parameters, such that the intended changes of grid bias voltage produce practically no change in grid current, will be very satisfactory as a high impedance coupling device for the phototube since its input resistance is then almost entirely determined by the tube leakage resistance, and in most cases is in the range of billions of megohms.

Another object of the present invention is to provide an automatic headlight dimming arrangement for vehicles and employing an ordinary phototube in a high sensitivity circuit connected to operate a relay switching system and dim the vehicle headlights when the light striking the phototube exceeds a predetermined amount.

A further object of the invention is to provide a simplified form of automatic headlight dimming arrangement employing an ordinary phototube in a highly sensitive circuit, together with a low gain direct current amplifier having means to automatically reduce the gain of the amplifier as the operating supply voltage increases, thereby improving the stability of the arrangement over varying conditions of vehicle operation.

A further object of the invention is to provide an improved automatic headlight dimming arrangement having means to maintain the dim operation of the headlights for a predetermined period of time after they are initially automatically dimmed to thus assure that the headlights will remain dim during passage of an oncoming vehicle even though such oncoming vehicle may have dimmed its headlights to thus reduce the light striking the light sensitive element of the headlight dimming arrangement.

In practising the invention to attain the above objects, an ordinary phototube is connected in series with a very high resistance load resistor across the positive and negative terminals of a source of direct current. A first vacuum tube is provided and connected in a cathode follower circuit with its plate electrode connected directly to the positive terminal of the direct current source and its grid electrode connected to the junction between the phototube and its load resistor. The cathode electrode of the vacuum tube is connected through an output load resistor to the negative terminal of the direct current source. A simple form of direct current balanced amplifier employing second and third vacuum tubes is connected to amplify the output voltage across the cathode output load resistor of the first tube. The bias of the second or amplifier tube is automatically controlled by the operation of the third or control tube in response to changes in potential of the direct current operating source such that the gain of the amplifier is reduced as the operating potential increases to thus provide stability. In order to control the vehicle headlights, a voltage sensitive relay is connected in series with the plate electrode of the second or amplifier tube. When such relay is first in the operative condition to dim the vehicle headlights due to the intensity of light on the phototube increasing above a predetermined amount to cause corresponding operation of the amplifier tube, a previously charged condenser is connected to discharge its stored voltage through a discharge circuit connected to the control grid electrode of the third or control tube in a manner to bias the second or amplifier tube to maintain the de-energized condition of the relay for a predetermined minimum period of time as determined by the time constants of the condenser discharge circuit. Thus in such manner, the headlights will remain dim for a predetermined time interval even though the light intensity on the phototube may be rising or falling at the same time. It is pointed out that the delay circuit is uni-directional, that is, the delay takes place only after switching from bright to dim. A light encountered immediately after switching to bright will cause instantaneous dimming.

Further objects, features and the attending advantages of the invention will be apparent with reference to the following specification and drawings, in which:

Fig. 1 is a simplified circuit diagram of the light sensitive phototube and cathode follower tube circuit;

Fig. 2 is a curve to show the desired range of operation for the cathode follower circuit of Fig. 1; and Fig. 3 is a schematic diagram of a presently preferred form of headlight dimming arrangement, including a phototube with its cathode follower coupling circuit and a direct current amplifier circuit, together with a relay switching system.

Referring now to Fig. 1 of the drawings, the light sensitive circuit of the invention is comprised of the phototube 10, which may be of any well-known type, and a very high resistance value phototube load resistor 11. A source of direct current (not shown), having positive and negative terminals 12 and 13, is provided. A potentiometer voltage divider 14 is connected across the terminals 13 and 13; and the phototube 10 and load resistor 11 are connected in series between the negative terminal 13 and the adjustable tap 15 of the potentiometer 14. A vacuum tube 16, having at least the plate 17, control grid 18 and cathode electrodes 19 is also provided to be connected as a very high or infinite impedance cathode follower coupling device for the voltage signal developed by the light sensitive circuit. The plate electrode 17 is connected directly to the positive terminal 12 and the cathode electrode 19 is connected through the cathode output load resistor 20 to the negative terminal 13. The usable output signal appears across the cathode load resistor 20 at terminals 21 and 13. The junction 22 between the series connected phototube 10 and phototube load resistor 11 is connected to the control grid 18. It will be understood that suitable filament and filament current supply (not shown) are provided for the vacuum tube 16.

In operation, the potentiometer 14 is adjusted to provide the desired range of operating bias voltage on the control grid 18 for the desired range of light intensities on the phototube 10. As the light intensity on the phototube 10 increases, the resistance of the phototube decreases and the voltage on the control grid 18 is lowered, which, in effect, becomes more negative with respect to the plate. The current through tube 16 therefore is lowered and the cathode 19 follows the control grid 18 to become more negative. Thus the potential across the output load resistor 20 is lowered as light intensity on the phototube 10 is increased. It is well-known that cathode follower circuits may be designed to operate such that small changes in grid bias voltage produce relatively large corresponding changes in cathode voltage.

Referring now to Fig. 2, I have found that the greatest sensitivity from an ordinary phototube may be obtained when the cathode follower circuit is operating in the range of grid bias voltage for which small changes in bias voltage cause practically no change in grid current. A typical curve of grid bias voltage and current relationship for a cathode follower connected vacuum tube is shown, and it will be noted that minimum grid current is drawn by a grid bias voltage of about −2 volts. It will also be noted that the grid current curve is essentially flat in the grid bias range of about −2 volts so that intended changes of grid voltage do not cause any appreciable change in grid current.

The following table of typical values of circuit components shown in Fig. 1 may be used to obtain the desired operating range for the cathode follower when the phototube is used to respond to oncoming vehicle headlights in an automatic headlight dimming arrangement. The voltage across the positive and negative terminals is determined to be about 65 volts.

Tube 16 is a type 6C4 or equivalent

Phototube Output
- Potentiometer 14 has a value of 250,000 ohms
- Load resistor 11 has a value of 40,000 megohms
- Load resistor 20 has a value of 1 megohm The potentiometer 14 is adjusted to provide a grid bias voltage on control grid 18 of about −2 volts with respect to the cathode 19 for the darker intended conditions of light intensity on the phototube 10. Under such conditions of operation, the input resistance of the cathode follower coupling device is practically infinite and only about 100 billionth of an ampere of current is drawn from the phototube circuit. Therefore, the very high phototube load resistor having a value at least as great as 30,000 megohms may be used to provide high sensitivity for the phototube.

Referring now to Fig. 3 of the drawings, a typical headlight dimming circuit, according to the invention, will now be described. The vehicle battery (not shown), which may have a potential of about 6 volts, is adapted to be connected to the positive and negative terminals 30 and 31 with the negative terminal 31 also connected to the ground. The headlight lamps are provided with a dim filament 32 and a bright filament 33 which are alternately energized from terminals 30 and 31 by the operation of the relay switch armature 34 and contacts 35 or 36, as will be described. The filaments V1F, V2F and V3F of tubes V1, V2 and V3 are connected across terminal 30 and 31 to be energized thereby.

A conventional vibrator converter and rectifier power supply having the vibrator 40, transformer 41, rectifier 42, and filter condenser 43, 44 is provided to convert the vehicle battery potential of about 6 volts appearing across terminals 30, 31 to a direct current of higher potential having a grounded negative or B− terminal 45 and a positive or B+ terminal 46.

The light sensitive circuit and apparatus including phototube 50, phototube load resistor 51, potentiometer 52, cathode follower connected vacuum tube V1 and cathode output load resistor 53 are connected and operated as previously described in connection with Figs. 1 and 2 of the drawings. This equipment may be located behind the vehicle windshield so that the phototube 50 may respond to the light from oncoming vehicle headlights. The phototube circuit and cathode follower tube V1 obtain their operating potentials through the cable 55 connecting to the terminals 45, 46. A voltage dropping resistor 56 is used to provide a plate potential of about 65 volts on the plate electrode of the cathode follower tube V1.

The vacuum tube V2 is connected as a direct current amplifier with its control grid 60 connected to the cathode of the cathode follower tube V1 and the output signal appearing across the output resistor 53. The cathode 61 is returned to the negative or grounded terminal 45 through the bias resistor 62; and the plate 63 is connected through a relay coil 64 and the plate load resistor 65 to the positive terminal 46.

As thus far described, the circuit is shown in the condition when the light intensity on the phototube 50 is increased by an oncoming vehicle headlight, to decrease the resistance of phototube 50 and make the control grid of cathode follower tube V1 more negative, thus making the control grid 60 of tube V2 more negative and raising the potential of plate 63 to lower the current through relay coil 64 and deenergize relay coil 64. With relay coil 64 deenergized, relay armature 66 is in the open circuit position with respect to contact 67, thus opening the circuit to and deenergizing relay coil 70, to cause relay armature 34 to engage contact 35 and energize the dim filament 32 of the headlight lamps. After the oncoming vehicle is passed, and the circuit returns to normal, the phototube will no longer be exposed to higher light intensity and its resistance will increase, thus making the potential on control grid 60 more positive and increasing the current through relay coil 64 to operate such relay and relay 70 to thereby connect the bright headlight filament 33 through contact 36 to the vehicle battery.

To obtain stability for the light sensitive circuit including tube V1 and the direct current amplifier circuit including tube V2 when the voltage source across terminals 45, 46 fluctuates in potential due to unavoidable fluctuation of the vehicle battery supply potential, the control tube V3 is provided. Cathode electrode 75 is connected to cathode 61 and through the common bias resistor 62 to the negative terminal 45. The plate electrode 76 is connected through plate load resistor 65 to the positive terminal 46. A voltage divider comprised of resistors 77 and 78 is connected between terminals 45, 46 and the junction between resistors 77, 78 is connected through a current limiting resistor 79 to the control grid 80 of control tube V3. As the potential of the supply voltage across terminals 45, 46 tends to rise, the junction between resistors 77, 78 and control grid 80 becomes more positive to increase the current flow through the common bias resistor 62, making the cathode 61 of amplifier tube V2 more positive and reducing the current flow through amplifier tube V2. Thus, the gain of the direct current amplifier tube V2 is automatically reduced as the supply voltage increases to provide a form of balanced direct current amplifier.

It may be desirable to provide a delay circuit to maintain the dim operation of the headlights for a predetermined minimum time interval after the start of each automatic dimming operation. It will be noted that relay 70 must be energized to connect the bright headlight filament to be energized. When relay 70 is energized, the condenser 90 is connected through relay armature 91 and contact 92 to be charged to the potential appearing across terminals 45, 46. When relay 70 is first deenergized to connect the dim headlight filaments 32 to be energized, the relay armature 91 connects the condenser 90 to contact 93 to discharge through a discharge circuit including resistors 94 and 78. The potential on condenser 90 therefore raises the positive potential at point 95 and also on the control grid 80 of control tube V3, making tube V3 more conductive and tube V2 less conductive, thus maintaining the deenergization of relays 64 and 70 for at least a minimum time interval determined by the time constants of the discharge circuit for condenser 90. A minimum time interval of about 8 seconds has been found to be desirable as that is about the average time for approach of an oncoming vehicle in the desired headlight range for dim headlights.

While there has been described a presently preferred embodiment of the invention, it should be understood that various forms of relay switching systems and amplifiers may be used to respond to the light sensitive phototube circuit of the invention for automatically dimming headlights or performing other desired functions.

I claim:

1. An automatic vehicle headlight dimming system operative from a vehicle battery supply and including in combination, a source of direct current having positive and negative terminals, a phototube, a high resistance phototube load resistor, means connecting said phototube and said resistor in series across said positive and negative terminals to be energized by said source of direct current, a vacuum tube connected in a cathode follower circuit obtaining its operating potential from the positive and negative terminals of said source of direct current, the parameters of said cathode follower circuit being such that the intended changes in grid bias voltage cause very little change in grid current, means connecting the junction of said phototube and said resistor to the input of said cathode follower circuit, a direct current amplifier circuit having first and second vacuum tubes each having at least plate, control grid and cathode electrodes, the control grid of said first vacuum tube being directly connected to the output voltage of said cathode follower circuit, means connecting the cathode electrodes of both said first and second vacuum tubes together and through a common resistor to the negative terminal of said direct current source, means connecting the plate electrode of said second tube through a load resistor to the positive terminal of said source, a voltage divider connected between the positive and negative terminals of said voltage source, means connecting a tap of said voltage divider to the control grid electrode of said second vacuum tube, and headlight control means operated by the output voltage of said amplifier to automatically dim the vehicle headlights when light intensity on said phototube is greater than a predetermined amount, said headlight control means including a voltage sensitive relay having its relay coil connected between the plate electrodes of said first and second vacuum tubes.

2. The automatic vehicle headlight dimming system of claim 1 wherein said high resistance phototube load resistor has a resistance value not less than 10,000 megohms.

3. The invention of claim 1 and further including, a condenser, means to normally connect said condenser to be charged to the potential of said source of direct current, and means responsive to a condition of operation of said relay to connect the positively charged terminal of said condenser to the tap of said voltage divider in a condenser discharging circuit through a portion of the resistance of said divider to thereby affect the operation of said first and second vacuum tubes in a manner to maintain the dim operation of the vehicle headlights for a predetermined time after the light intensity on said phototube has exceeded the predetermined amount.

4. The automatic vehicle headlight dimming system of claim 1, further including means to automatically decrease the gain of said amplifier in response to increases in potential of said source of direct current.

5. The invention of claim 1 wherein said high resistance phototube load resistor has a resistance value not less than 10,000 megohms, and further including a condenser, means to normally connect said condenser to be charged to the potential of said source of direct current, and means responsive to a condition of operation of said relay to connect the positively charged terminal of said condenser to the tap of said voltage divider in a condenser discharging circuit through a portion of the resistance of said divider to thereby affect the operation of said first and second vacuum tubes in a manner to maintain the dim operation of the vehicle headlights for a predetermined time after the light intensity on said phototube has exceeded the predetermined amount.

References Cited in the file of this patent

UNITED STATES PATENTS

| | | |
|---|---|---|
| 1,942,289 | Hipp | Jan. 2, 1934 |
| 2,281,205 | Schock | Apr. 28, 1942 |
| 2,463,985 | Linde | Mar. 8, 1949 |
| 2,525,020 | De Jarlais | Oct. 10, 1950 |
| 2,558,969 | Le Croy | July 3, 1951 |
| 2,582,676 | Brodewieck et al. | Jan. 15, 1952 |

OTHER REFERENCES

Zworykin and Ramberg: "Photoelectricity and its Application," John Wiley & Sons Inc., 1944, pp. 229–231.